(12) United States Patent
Sun et al.

(10) Patent No.: US 12,041,007 B2
(45) Date of Patent: Jul. 16, 2024

(54) COUNTING ACTIVE RESOURCES FOR UE PROCESSING COMPLEXITY RELATED CAPABILITY

(71) Applicant: Apple Inc., Cupertino, CA (US)

(72) Inventors: Haitong Sun, Cupertino, CA (US); Yeong-Sun Hwang, Germering (DE); Dawei Zhang, Saratoga, CA (US); Wei Zeng, Saratoga, CA (US); Yushu Zhang, Beijing (CN); Ismael Gutierrez Gonzalez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,797

(22) PCT Filed: Jan. 15, 2021

(86) PCT No.: PCT/CN2021/072013
§ 371 (c)(1),
(2) Date: Sep. 22, 2021

(87) PCT Pub. No.: WO2022/151309
PCT Pub. Date: Jul. 21, 2022

(65) Prior Publication Data
US 2023/0361967 A1 Nov. 9, 2023

(51) Int. Cl.
*H04W 56/00* (2009.01)
*H04B 7/06* (2006.01)
*H04L 5/00* (2006.01)

(52) U.S. Cl.
CPC ......... *H04L 5/0053* (2013.01); *H04B 7/0628* (2013.01)

(58) Field of Classification Search
CPC .......................... H04L 5/0053; H04B 7/0628
USPC ....................................................... 370/329
See application file for complete search history.

(56) References Cited

U.S. PATENT DOCUMENTS

| | | | |
|---|---|---|---|
| 2019/0174466 A1 | 6/2019 | Zhang et al. | |
| 2021/0075486 A1 | 3/2021 | Song et al. | |
| 2021/0328644 A1* | 10/2021 | Hao | ...................... H04L 5/0057 |

(Continued)

FOREIGN PATENT DOCUMENTS

| | | |
|---|---|---|
| CN | 110035427 A | 7/2019 |
| CN | 110650001 A | 1/2020 |

OTHER PUBLICATIONS

International Search Report and Written Opinion of the International Searching Authority directed to related International Patent Application No. PCT/CN2021/072013, dated Oct. 18, 2021; 8 pages.

(Continued)

*Primary Examiner* — Sai Ming Chan
(74) *Attorney, Agent, or Firm* — Sterne, Kessler, Goldstein &Fox P.L.L.C.

(57) ABSTRACT

Apparatuses, systems, and methods for counting active resources for UE processing complexity related capability. A cellular base station may comprise at least one antenna; at least one radio coupled to the at least one antenna; and a processor coupled to the at least one radio. The cellular base station is configured to count a total number of active resources in a slot, wherein an active resource is defined for counting a number of CSI resources a UE needs to process simultaneously in a slot.

20 Claims, 13 Drawing Sheets

(56) References Cited

U.S. PATENT DOCUMENTS

2022/0070921 A1* 3/2022 Xue .................... H04W 72/044
2023/0048322 A1* 2/2023 Takahashi ................. H04L 5/00

OTHER PUBLICATIONS

Moderator (NTT DOCOMO), "Summary of LS on CSI-RS capabilities," R1-2002910, 3GPP TSG RAN WG1 Meeting #100bis-e, e-Meeting, Apr. 30, 2020; 13 pages.
3GPP TS 38.214 V16.3.0, 3rd Generation Partnership Project; Technical Specification Group Radio Access Network; NR; Physical layer procedures for data (Release 16), Sep. 2020; 166 pages.
Moderator (AT&T), "Summary of email discussion/approval [103-e-NR-UEFeatures-eMIM0-01]," R1-2009348, Nov. 13, 2020; 17 pages.
Extended European Search Report directed to related European Application No. 21918517.0, mailed Apr. 10, 2024; 13 pages.

* cited by examiner

800 counting a total number of active resources in a slot, wherein an active resource is defined for counting a number of CSI resources a UE needs to process simultaneously in a slot
801

*FIG. 8*

COUNTING ACTIVE RESOURCES FOR UE PROCESSING COMPLEXITY RELATED CAPABILITY

FIELD

The present application relates to wireless communication, and more particularly to apparatus, systems, and methods for counting active resources for UE processing complexity related capability.

DESCRIPTION OF THE RELATED ART

Channel state information (CSI) processing is complicated for NR (NR Radio Access), there are two big categories of a UE (User Equipment) processing capability (as defined in 38.822, 38.306 and 38.331), i.e., Link Adaptation CSI (LA-CSI) related UE processing capability and Beam Management CSI (BM-CSI) related UE processing capability.

LA-CSI related UE processing capability includes e.g., Rel-15 MIMO codebook related resources (defined as FG2-36, FG2-40, FG2-41 and FG2-43), Rel-16 MIMO codebook related resources (defined as FG16-3a, FG16-3a-1, FG16-3b, FG16-3b-1), Concurrent MIMO codebook related resources (defined as FG16-8), and total LA-CSI related resources (defined as FG2-33), etc.

BM-CSI related UE processing capability includes e.g., L1-RSRP resources (defined as FG 2-24 in 38.822), Candidate beam for BFR resources (defined as FG2-31), L1-SINR resources (defined as FG16-1a-1), and total BM-CSI related resources. Total BM-CSI related resources includes L1-SINR resources, L1-RSRP resources, PathLoss resources, BFD (Beam Failure Detection) resources, CBD (Candidate Beam Detection) resources and RLM (Radio Link Monitoring) resources (as defined as FG16-1g and FG16-1g-1), etc.

In general, the CSI resource related UE capability is divided into two big categories: (1) the UE processing complexity related capability, and (2) the UE memory related capability. The UE processing complexity related capability may be defined as the maximum number of CSI resources a UE can handle simultaneously within a reference slot. The UE memory related capability may be defined as the maximum number of CSI resources that can be configured.

The UE memory related capability has been relatively well defined for both LA-CSI and BM-CSI. The UE processing complexity related capability has been relatively well defined for LA-CSI, but has not well defined for BM-CSI especially in terms of two things: how to define when a CSI resource is active, i.e. the time domain behavior of the RS; and how to define when multiple resources with the same ID is configured, i.e., uniqueness of the BM-CSI resource.

It is desirable to address the design of counting rule for UE processing complexity related capability for BM-CSI reference signals.

SUMMARY

Embodiments relate to apparatuses, systems, and methods for counting active resources for UE processing complexity related capability.

According to the techniques described herein, a cellular base station may count a total number of active resources in a slot, wherein an active resource is defined for counting a number of CSI resources a UE needs to process simultaneously in a slot.

For different reference signals, such as CSI-RS, CSI-IM or SSB, one or more corresponding active resources may be counted based on corresponding counting rules. The uniqueness of resources also is considered.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8 is a flowchart diagrams illustrating an example method performed by a cellular base station according to some embodiments;

Figure 1:
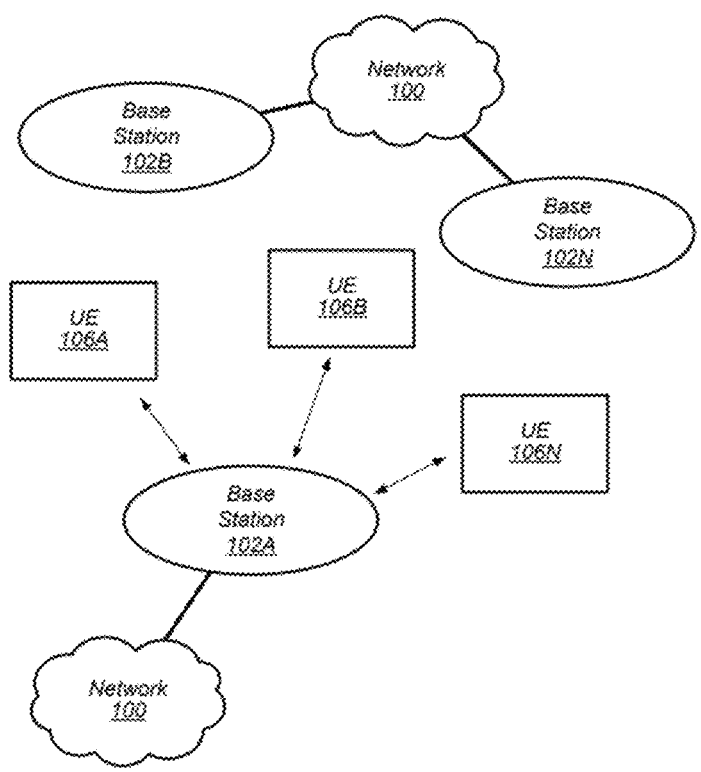
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network.

The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to."

Reciting a component that is configured to perform one or more tasks is expressly intended not to invoke 35 U.S.C. § 112(f) interpretation for that component.

Figure 2:
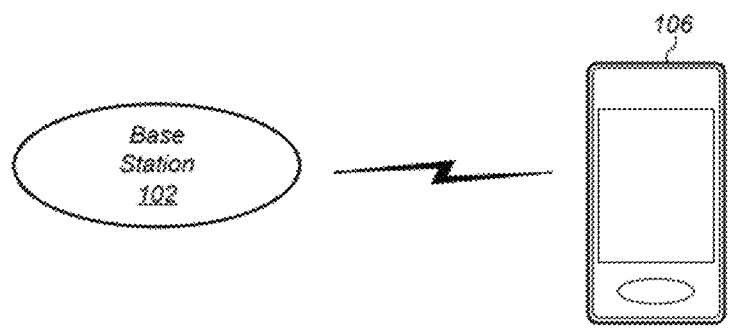
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
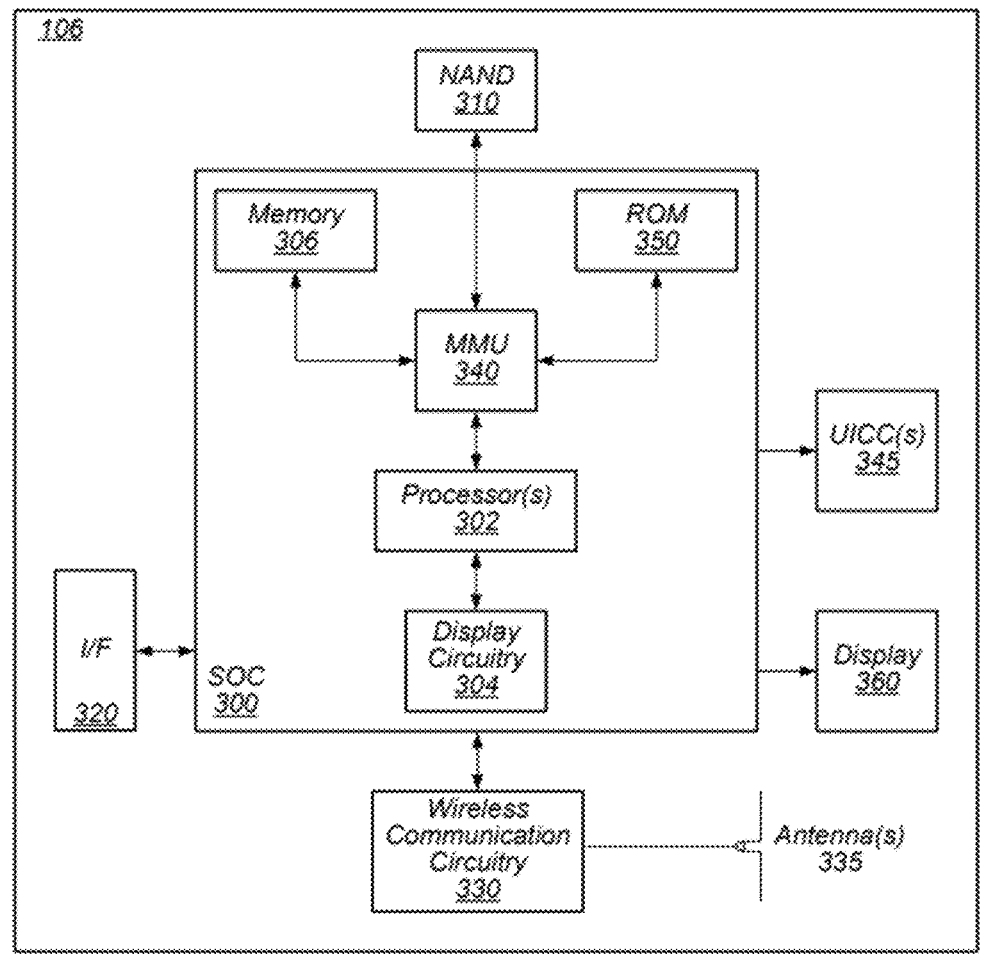
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
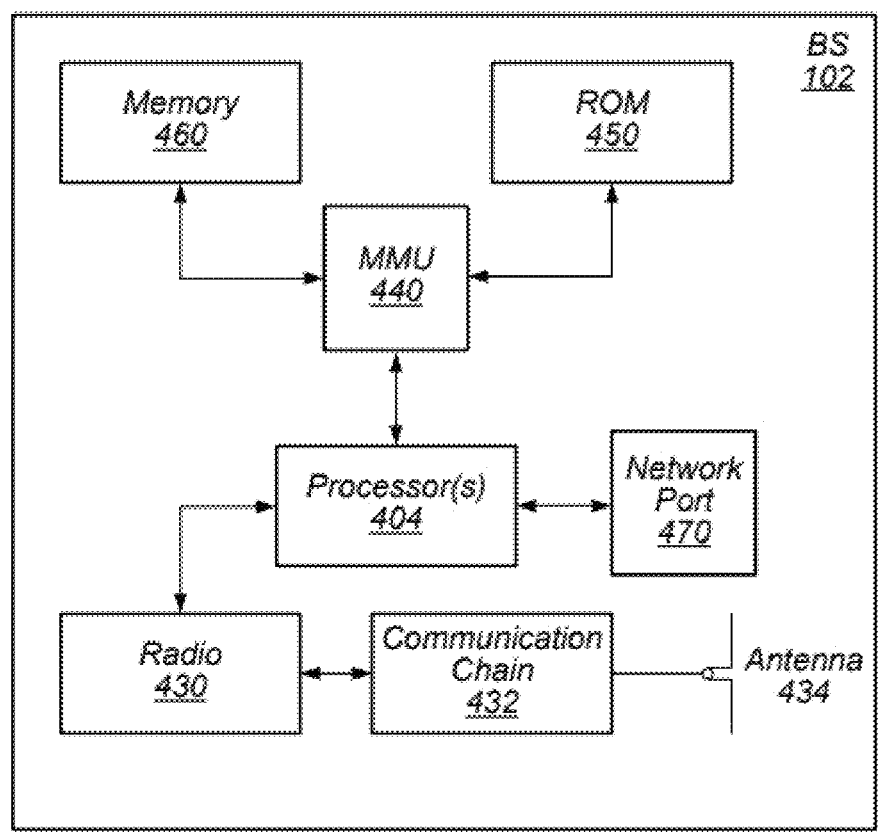
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
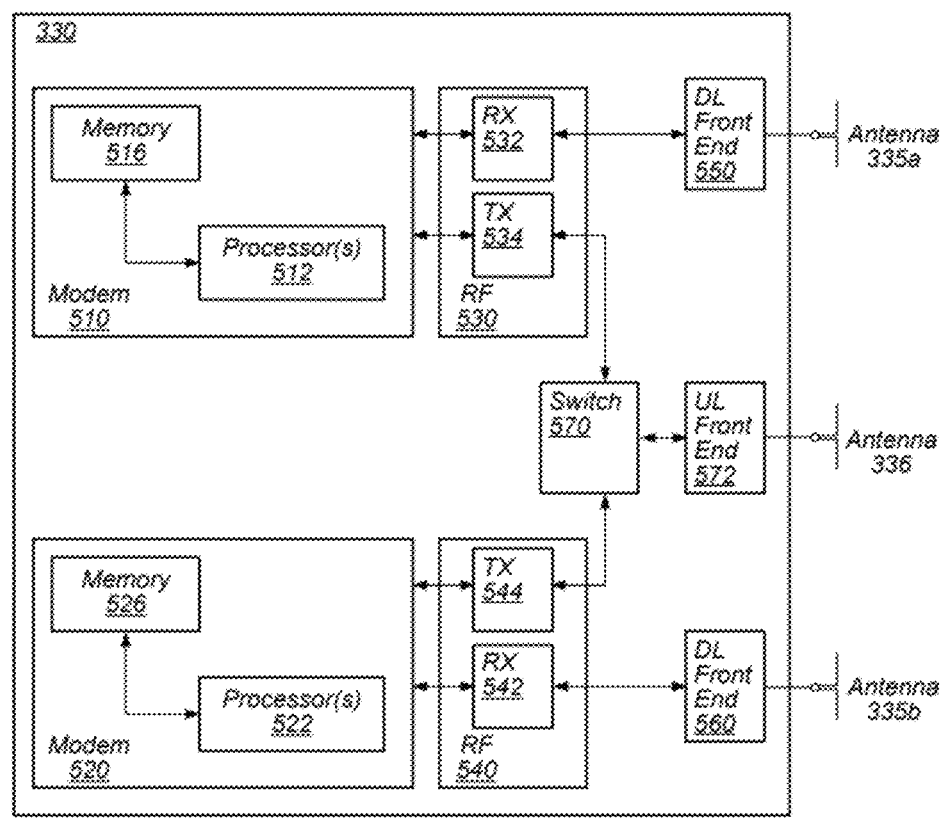
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6A:
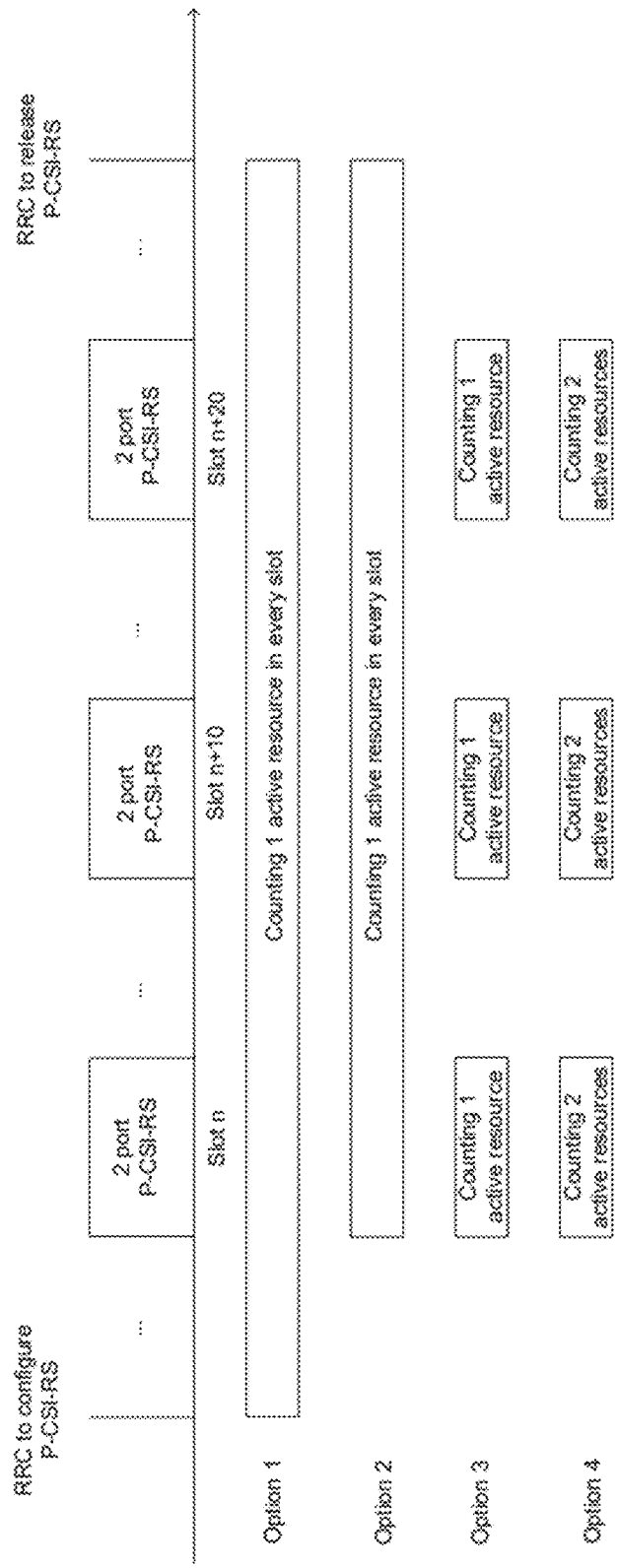
FIG. 6A illustrates example active CSI-RS counting options for periodic CSI-RS according to some embodiments.

FIG. 6A—Active CSI-RS Counting—Periodic CSI-RS

The disclosure focuses on the design of counting rule for UE processing complexity related capability for e.g., BM-CSI reference signals. The disclosure defines an active resource for counting the number of CSI resources that a UE needs to process simultaneously in a slot.

There are three reference signals for CSI measurement: CSI-RS, CSI-IM and SSB. Those signals are transmitted using certain resources, i.e. time/domain resources for CSI measurement. CSI resources can carry CSI-RS, or SSB, or CSI-IM. CSI resources are the resources, i.e. subcarriers, used for transmitting reference signals. For example, each slot may contain 14 symbols and each symbol may contain a number of subcarriers. Each CSI resource may only occupy a subset of resources (subcarriers) in a slot.

Whether a CSI resource is active in the slot, it means that the CSI resource is counted in the slot when counting the number of CSI resources that the UE needs to process simultaneously in the slot. If a CSI resource is active in the slot, it may be counted as one or more active resources in the slot. In other words, whether a CSI resource is active in a slot means whether it is counted in the slot or not.

FIG. 6A illustrates example active CSI-RS counting options for periodic CSI-RS according to some embodiments.

FIG. 6A shows that for periodic CSI-RS, i.e. P-CSI-RS, the corresponding active resource may be counted with one of 4 options as shown.

As shown, after CSI resource and report are configured by higher layer signaling, e.g., RRC, the configured CSI-RS will be sent periodically before the CSI resource and report are released by the higher layer signaling.

In option 1, each P-CSI-RS resource is active and counted as 1 from when the periodic CSI-RS is configured by higher layer signaling, and ending when the periodic CSI-RS configuration is released.

That is, for each periodic CSI-RS, 1 active resource is counted in every slot within a time duration from when the periodic CSI-RS is configured by higher layer signaling to when the periodic CSI-RS is released by the higher layer signaling.

As shown, the P-CSI-RS is assumed to be transmitted once every 10 slots. In each of the slots (including those slots with actual transmission of the P-CSI-RS, e.g., slot n, slot n+10 and slot n+20, and those slots without actual transmission of the P-CSI-RS) within the time duration from the RRC configures the P-CSI-RS to the RRC releases the P-CSI-RS, 1 active resource is counted.

In option 2, for each periodic CSI-RS, 1 active resource is counted in every slot within a time duration from a first transmission of the periodic CSI-RS (it is assumed the P-CSI-RS is transmitted in slot n for the first time in FIG. 6A) to when the periodic CSI-RS is released by the higher layer signaling.

In option 3, each P-CSI-RS resource is active and counted as 1 only in the slot it is transmitted. That is, for each P-CSI-RS, 1 active resource is counted only in a slot within which the CSI-RS is actually transmitted. As shown in FIG. 6A, only in each of the slots with actual transmission of P-CSI-RS, e.g., the slots n, n+10 and n+20, 1 active resource is counted. For those slots without actual transmission of P-CSI-RS, no active resource is counted.

In option 4, each P-CSI-RS resource is active and counted as number of ports only in the slot it is transmitted.

That is, for each P-CSI-RS, a number of active resources same as a number of ports of the P-CSI-RS is counted only in a slot within which the P-CSI-RS is transmitted. As shown in FIG. 6A, the P-CSI-RS is a 2-port P-CSI-RS, i.e., the number of ports of the P-CSI-RS is 2. Then only in each of the slots with actual transmission of P-CSI-RS, e.g., the slots n, n+10 and n+20, 2 active resources are counted. For those slots without actual transmission of the P-CSI-RS, no active resource is counted.

Figure 6B:
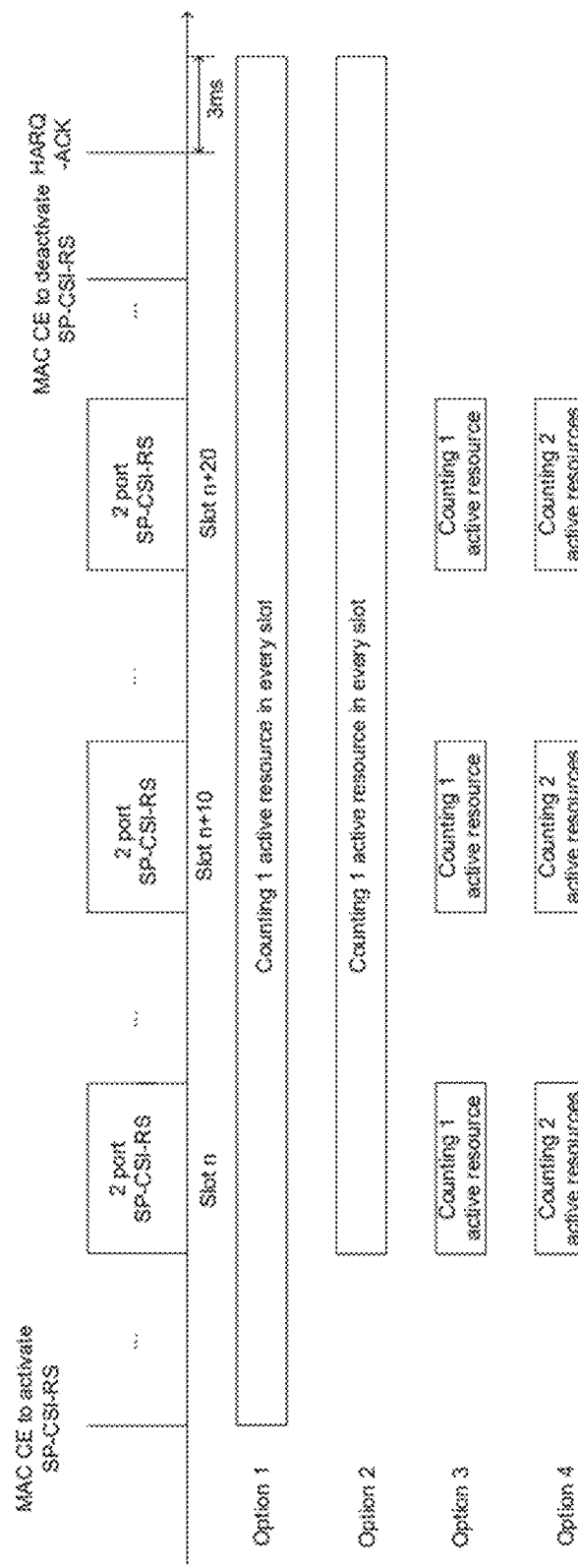
FIG. 6B illustrates example active CSI-RS counting options for semi persistent CSI-RS according to some embodiments.

FIG. 6B—Active CSI-RS Counting—Semi Persistent CSI-RS

FIG. 6B illustrates example active CSI-RS counting options for semi persistent CSI-RS according to some embodiments.

FIG. 6B shows that for semi persistent CSI-RS, i.e. SP-CSI-RS, the corresponding active resource may be counted with one of 4 options as shown.

As shown, after an activation command, e.g., MAC CE, is applied to the SP-CSI-RS, the SP-CSI-RS may be sent periodically before a deactivation command is applied.

In option 1, each SP-CSI-RS resource is active and counted as 1 from the end of when the activation command is applied, and ending at the end of when the deactivation command is applied.

That is for each semi persistent CSI-RS, 1 active resource is counted in every slot within a time duration from when the semi persistent CSI-RS is activated by MAC CE to when the semi persistent CSI-RS is deactivated by MAC CE.

As shown, the SP-CSI-RS is assumed to be transmitted once every 10 slots. In each of all the slot (including those slots with actual transmission of the SP-CSI-RS, e.g., slot n, slot n+10 and slot n+20, and those slots without actual transmission of the SP-CSI-RS) within the time duration from the MAC CE activates the SP-CSI-RS to the MAC CE deactivates the SP-CSI-RS, 1 active resource is counted.

In option 2, for each SP-CSI-RS, 1 active resource is counted 1 in every slot within a time duration from a first transmission of the SP-CSI-RS (it is assumed the SP-CSI-RS is transmitted in slot n for the first time in FIG. 6B) to when The MAC CE deactivates the SP-CSI-RS.

In option 3, each SP-CSI-RS resource is active and counted as 1 only in the slot it is transmitted. That is, for each SP-CSI-RS, 1 active resource is counted only in a slot within which the SP-CSI-RS is actually transmitted. As shown in FIG. 6B, only in each of the slots with actual transmission of SP-CSI-RS, e.g., the slots n, n+10 and n+20, 1 active resource is counted. For those slots without actual transmission of SP-CSI-RS, no active resource is counted.

In option 4, each SP-CSI-RS resource is active and counted as number of ports only in the slot it is transmitted.

That is, for each SP-CSI-RS, a number of active resources same as a number of ports of the SP-CSI-RS is counted only in a slot within which the SP-CSI-RS is transmitted. As shown in FIG. 6B, the SP-CSI-RS is a 2-port SP-CSI-RS, i.e., the number of ports of the SP-CSI-RS is 2. Then only in each of the slots with actual transmission of SP-CSI-RS, e.g., the slots n, n+10 and n+20, 2 active resources are counted. For those slots without actual transmission of SP-CSI-RS, no active resource is counted.

Figure 6C:
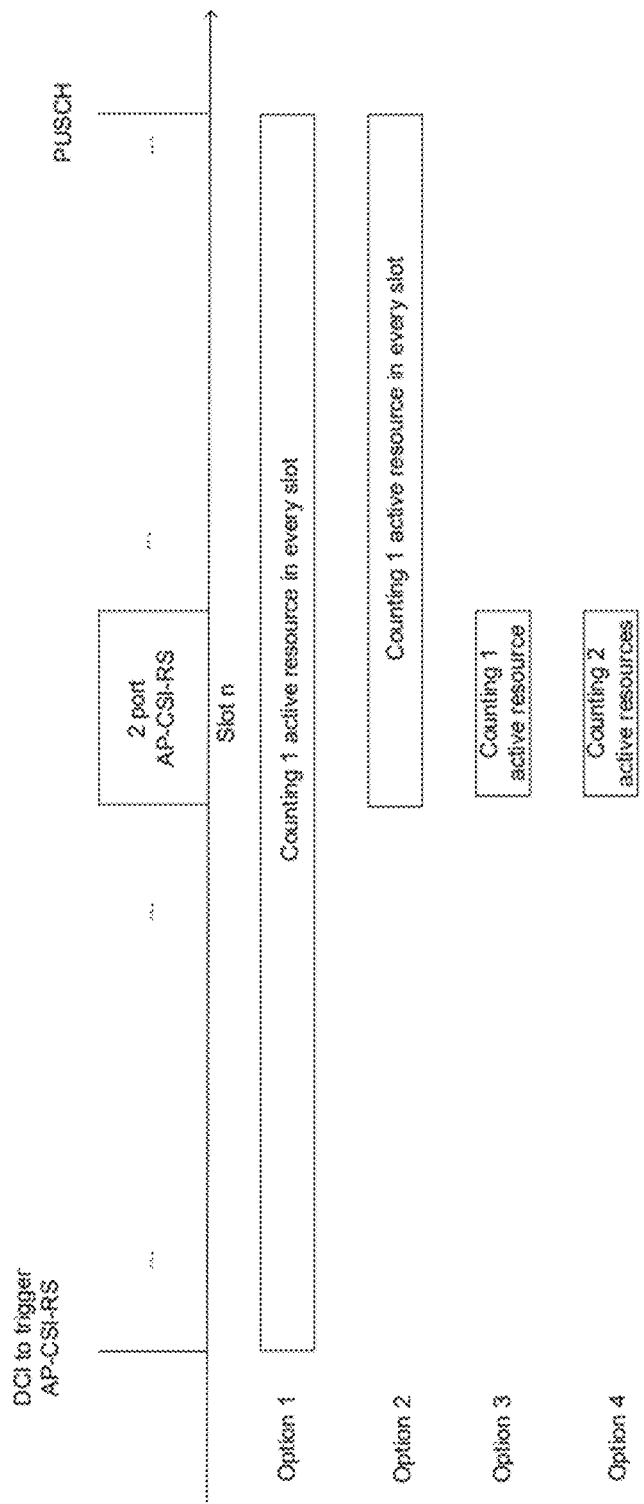
FIG. 6C illustrates example active CSI-RS counting options for aperiodic CSI-RS according to some embodiments.

FIG. 6C—Active CSI-RS Counting—Aperiodic CSI-RS

FIG. 6C illustrates example active CSI-RS counting options for aperiodic CSI-RS according to some embodiments.

FIG. 6C shows that for aperiodic CSI-RS, i.e. AP-CSI-RS, the corresponding active resource may be counted with one of 4 options as shown.

As shown, after DCI triggers the AP-CSI-RS sending and reporting, the AP-CSI-RS may be sent to the UE and the AP-CSI-RS reporting by the UE may be performed on PUSCH.

In option 1, each AP-CSI-RS resource is active and counted as 1 starting from the end of the PDCCH containing a request associated with this aperiodic CSI-RS and ending at the end of the PUSCH containing a report associated with this aperiodic CSI-RS.

That is, for each AP-CSI-RS, 1 active resource is counted in every slot within a time duration from when the aperiodic CSI-RS is triggered by DCI to an end of reporting associated with the aperiodic CSI-RS.

As shown in FIG. 6C, the AP-CSI-RS is assumed to be transmitted in slot n. In each of the slot (including the slot n with actual transmission of the AP-CSI-RS, and those slots without actual transmission of the AP-CSI-RS) within the time duration from the DCI triggers the AP-CSI-RS to the end of the PUSCH containing a report associated with the AP-CSI-RS, 1 active resource is counted.

In option 2, for each AP-CSI-RS, 1 active resource is counted 1 in every slot within a time duration from a first transmission of the AP-CSI-RS (it is assumed the AP-CSI-RS is transmitted in slot n for the first time in FIG. 6C) to the end of the PUSCH containing a report associated with the AP-CSI-RS.

In option 3, each AP-CSI-RS resource is active and counted as 1 only in the slot it is transmitted. That is, for each AP-CSI-RS, 1 active resource is counted only in the slot within which the AP-CSI-RS is actually transmitted. As shown in FIG. 6C, only in slot n with actual transmission of AP-CSI-RS, 1 active resource is counted. For those slots without actual transmission of AP-CSI-RS, no active resource is counted.

In option 4, each AP-CSI-RS resource is active and counted as number of ports only in the slot it is transmitted.

That is, for each AP-CSI-RS, a number of active resources same as a number of ports of the AP-CSI-RS is counted only in a slot within which the AP-CSI-RS is transmitted. As shown in FIG. 6B, the AP-CSI-RS is a 2-port AP-CSI-RS, i.e., the number of ports of the AP-CSI-RS is 2.

Active CSI-IM Counting

CSI-IM is ZP-CSI-RS (Zero Power CSI-RS) for IMR (Interference Measurement Reference).

For active CSI-IM counting for the UE computational complexity related capability reporting, one or multiple of the following can be adopted.

In some embodiments, for each CSI-IM, no active resources are counted in any slot. For example, periodic CSI-IM, i.e., P-CSI-IM, is not counted for the UE computational complexity related capability. Semi-persistent, CSI-IM, i.e., SP-CSI-IM, is not counted for the UE computational complexity related capability. Aperiodic CSI-IM, i.e., AP-CSI-IM, is not counted for the UE computational complexity related capability.

In some embodiments, for each CSI-IM, one or more active resources are counted similarly as for each CSI-RS as discussed before with reference to FIGS. 6A-6C.

For example, for each CSI-IM, 1 active resource is counted in every slot affected by a CSI report configuration configuring the CSI-IM.

In particular, for each periodic CSI-IM, 1 active resource is counted in every slot within a time duration from when the periodic CSI-IM is configured by higher layer signaling to when the periodic CSI-IM is released by the higher layer signaling (similar as Option 1 in FIG. 6A), or 1 active resource is counted in every slot within a time duration from a first transmission of the periodic CSI-IM to when the periodic CSI-IM is released by the higher layer signaling (similar as Option 2 in FIG. 6A).

For each semi persistent CSI-IM, 1 active resource is counted in every slot within a time duration from when the semi persistent CSI-IM is activated by MAC CE to when the semi persistent CSI-IM is deactivated by MAC CE (similar as Option 1 in FIG. 6B), or 1 active resource is counted in every slot within a time duration from a first transmission of the semi persistent CSI-IM to when the semi persistent CSI-IM is deactivated by MAC CE (similar as Option 2 in FIG. 6B).

For each aperiodic CSI-IM, 1 active resource is counted in every slot within a time duration from when the aperiodic CSI-IM is triggered by DCI to an end of reporting associated with the aperiodic CSI-IM. (similar as Option 1 in FIG. 6C), or 1 active resource is counted in every slot within a time duration from a first transmission of the aperiodic CSI-IM to an end of reporting associated with the aperiodic CSI-IM (similar as Option 2 in FIG. 6C).

In some embodiments, for each CSI-IM, 1 active resource is counted only in a slot within which the CSI-IM is transmitted. (Similar as Option 3 in FIG. 6A-6C.)

Figure 7A:
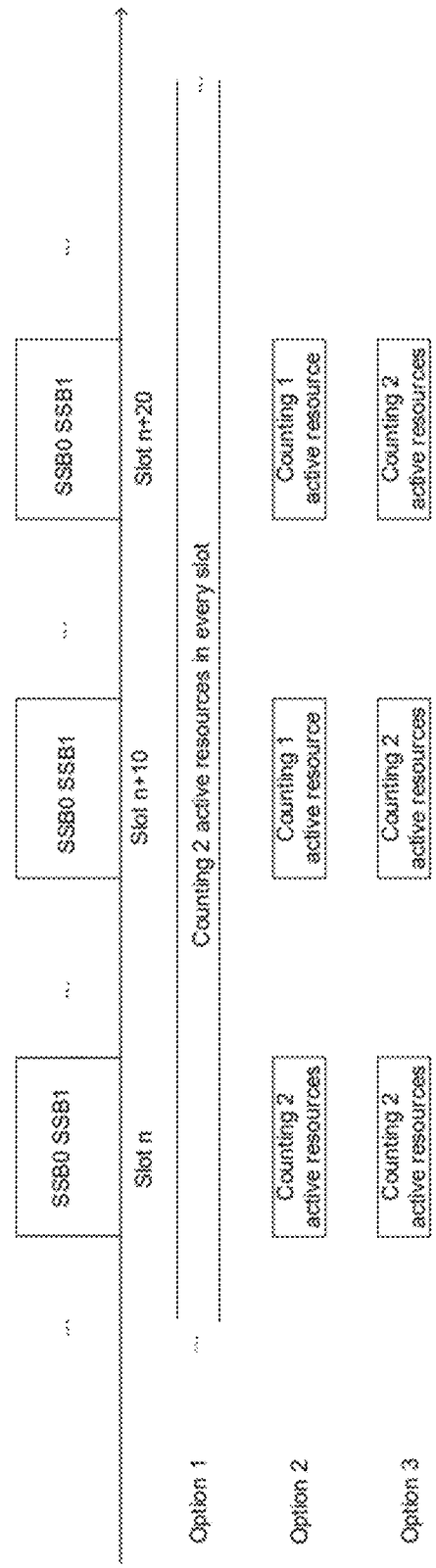
FIG. 7A illustrates example active SSB counting options according to some embodiments.

FIG. 7A—Active SSB Counting

FIG. 7A illustrates example active SSB counting options according to some embodiments.

FIG. 7A shows that for SSB, the corresponding active resource may be counted with one of 3 options as shown.

As shown, SSBs are always sent periodically by e.g., gNB.

In option 1, each SSB with a different SSB index is always counted in every slot. That is, for each SSB with a unique SSB index, 1 active resource is counted in every slot. When multiple SSBs, e.g., SSB 0 and SSB 1 are transmitted in a slot, each SSB is counted independently. As shown in FIG. 7, two SSBS, i.e., SSB 0 and SSB 1, are sent in one slot, and are sent once every 10 slots. Then, in every slot, no matter with or without transmission of the SSBs, 2 active resource are counted.

In option 2, each SSB with different SSB index is only counted in the slot it is transmitted. That is, for each SSB with a unique SSB index, 1 active resource is counted only in a slot (e.g., slots n, n+10 and n+20 in FIG. 7) within which the SSB is transmitted.

In option 3, for multiple SSBs with different SSB indexes transmitted within a slot, only 1 active resource is counted only in the slot within which the multiple SSBs are transmitted. As shown in FIG. 7, two SSBS, i.e., SSB 0 and SSB 1, are sent in one slot, e.g., slot n, but only 1 active resource is counted in the slot n.

Figure 7B:
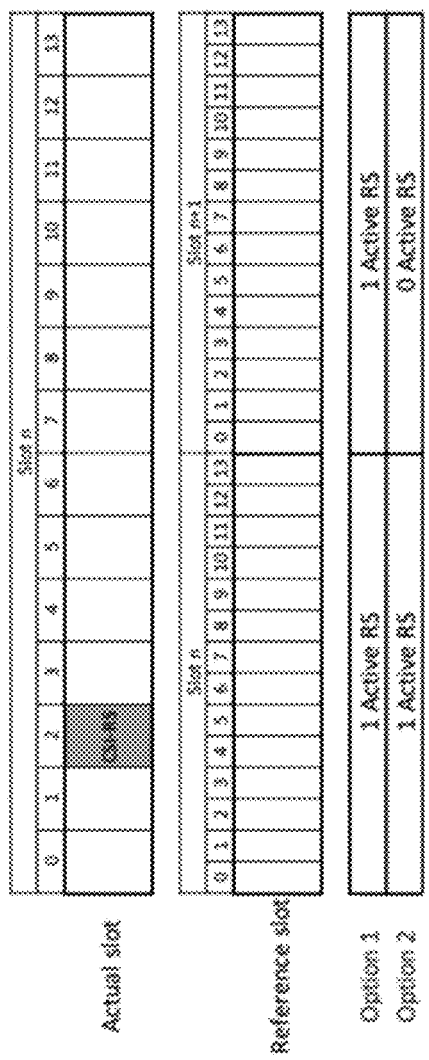
FIG. 7B illustrating example active resources counting in a reference slot according to some embodiments.

FIG. 7B—Counting of Active Resources in a Reference Slot

FIG. 7B illustrating example active resources counting in a reference slot according to some embodiments.

Two concepts are defined. One is actual slot, which is the slot of the component carrier in which the RS (CSI-RS, CSI-IM or SSB) is transmitted. Another is reference slot, which is the slot to count for the active RS for UE capability reporting.

In Option 1: for any reference slot overlapping the actual slot, a corresponding active resource is always counted in the reference slot. That is, for 1 active resource counted in an actual slot, 1 active resource is counted in every reference slot corresponding to the actual slot. As can be seen, in each of the reference slots n and n+1 overlapping the actual slot n, 1 active resource is counted.

In Option 2: a corresponding active resource is only counted when the resource overlaps with the reference slot. That is, for 1 active resource counted in an actual slot, counting 1 active resource only in a reference slot overlapping a part of the actual slot during which a CSI resource corresponding to the active resource is transmitted. As can be seen, in the reference slots n and n+1 overlapping the actual slot n, only slot n overlaps the CSI-RS resource in the actual slot, and only in the slot n, 1 active resource is counted.

Double Counting of Active Resources

The gNB can configure three types of references signals for UE measurement: NZP CSI-RS (Non Zero Power CSI-RS); CSI-IM (Zero Power RS for Interference Measurement); and SSB.

According to some embodiments, the rule of uniqueness can be different for different types of RS.

For example, for NZP CSI-RS, it is always unique. That is, the NZP-CSI-RS is always double counted when the same NZP-CSI-RS is configured multiple times, e.g., in the same CSI-ReportConfig or in different CSI-ReportConfig, with different purposes such as CBD, BFD, RLM, PL RS, etc.

For CSI-IM, it is never unique.

For SSB, it is never unique for each SSB index. That is, even if the same CSI-IM or SSB is configured for different scenarios, such as in different CSI-ReportConfig, with different purposes including PL RS, CBD, BFD, RLM, etc, it is never double counted.

According to some embodiments, the Uniqueness of RS may depend on the purpose of the resource. The purposes may comprise: L1-SINR and L1-RSRP; P3 (UE Rx beam sweep) procedure, i.e. NZP-CSI-RS-ResourceSet with "repetition"="on"; TRS, i.e., NZP-CSI-RS-ResourceSet with "trs-Info"="true"; Pathloss RS; BFD RS (Beam Failure Detection); CBD RS (Candidate Beam Detection); and RLM RS (Radio Link Monitoring).

For a particular type resource, among NZP-CSI-RS, CSI-IM and SSB, for some purpose, it is always double counted. For example, for CSI-RS used for L1-SINR and L1-RSRP, for the same CSI-RS resource configured in the same CSI-ReportConfig or in different CSI-ReportConfig, it is always double counted.

For some purpose, it is never double counted. For example, if the same CSI-RS is configured both RLM, and/or, BFD, and/or CBD, and/or, PL RS, it is not double counted, i.e., only counted as one.

According to some embodiments, the rule for double counting may be based on at least one of the following: (i) for CSI-IM and SSB, a corresponding number of active resources as counted in a corresponding slot is never double counted; (ii) for a single NZP CSI-RS, if it is configured for different purposes, a corresponding number of active resources as counted with respect to the NZP CSI-RS in a corresponding slot is double counted by a number of the different purposes; and (iii) for a single NZP CSI-RS, if it is configured for a first set of purposes, a number of active resources as counted with respect to the NZP CSI-RS in a corresponding slot is never double counted, and if it is configured for a second set of purposes, a number of active resources as counted with respect to the NZP CSI-RS in a corresponding slot is double counted by a number of the purposes in the second set.

FIG. 8—Counting of Active Resources in a Slot

FIG. 8 is a flowchart diagrams illustrating an example method 800 performed by a cellular base station according to some embodiments.

As shown, the method comprise step 801, at the step, a total number of active resources is counted in a slot, wherein an active resource is defined for counting a number of CSI resources a UE needs to process simultaneously in a slot.

Based on the counting rules as described above, for counting a total number of active resources in a slot, the reference signals, such as CSI-RS, CSI-IM, SSB, that are actually transmitted in the slot may be considered. In addition, the reference signals, such as CSI-RS, CSI-IM, SSB, that are not actually transmitted in the slot but affects the slot may also be considered, e.g. the scenarios considered in Options 1 or 2 in FIGS. 6A-6B and Option 1 in FIG. 7A.

In particular, for each of the reference signals related with the slot, a corresponding number of active resources may be counted. The sum of these corresponding numbers of active resources is the total number of active resources in a slot.

Figure 9:
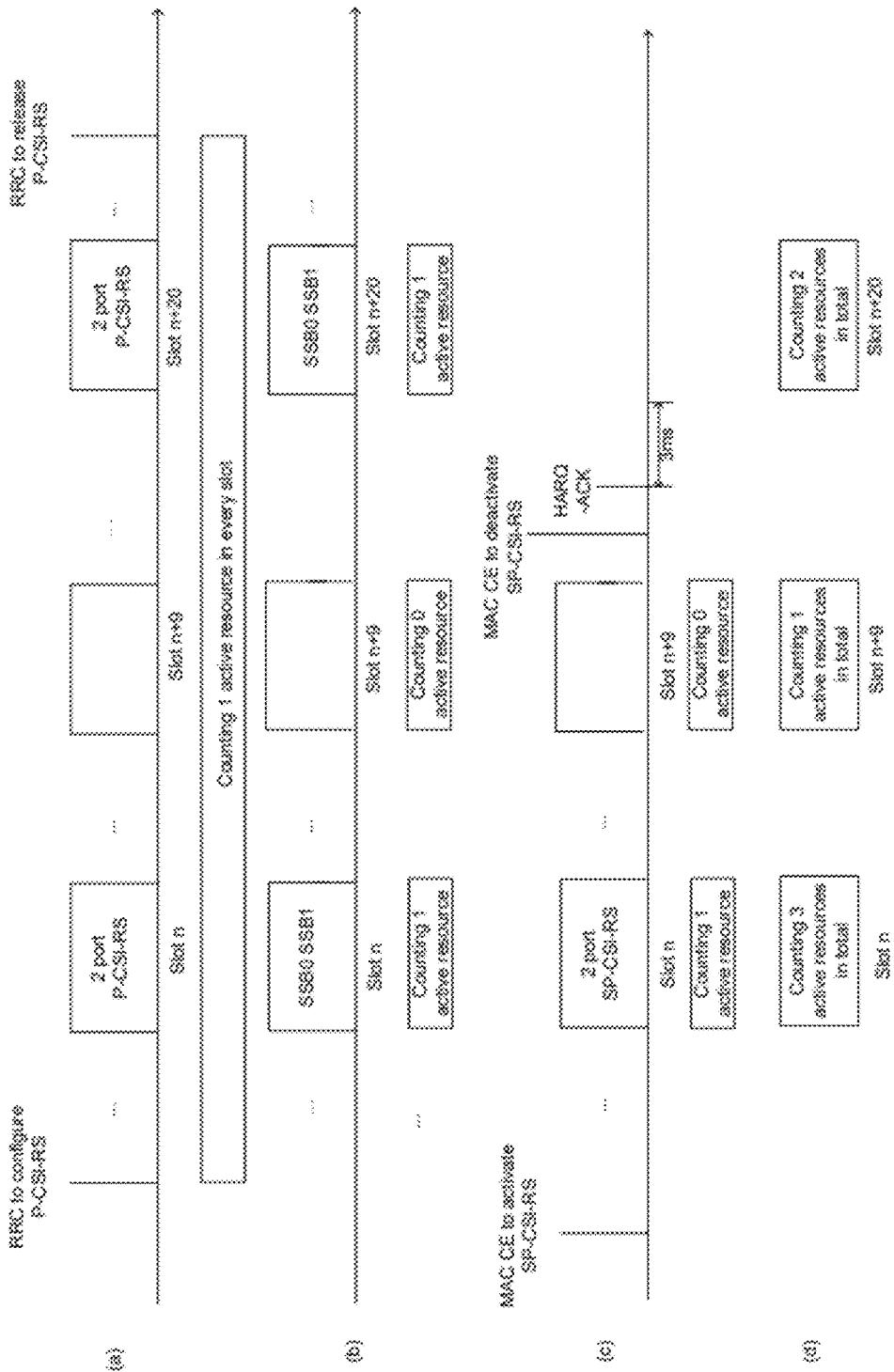
FIG. 9 is a diagram illustrating counting of a total number of active resources in a slot according to some embodiments.

FIG. 9—Counting of Active Resources in a Slot

FIG. 9 is a diagram illustrating example counting of a total number of active resources in a slot according to some embodiments.

As shown in FIG. 9, (a) shows the counting of active resources for P-CSI-RS with Option 1 in FIG. 6A, (b) shows the counting of active resources for SSB with Option 2, (c) shows the counting of active resources for SP-CSI-RS with Option 2, and (d) shows the total numbers of active resources in slots n, n+9, and n+20 respectively.

As can be seen, it is assumed that P-CSI-RS is transmitted in slot n and slot n+20 but is not actually transmitted in slot n+9, a set of SSB0 and SSB1 are transmitted in slot n and slot n+20 but is not actually transmitted in slot n+9, and SP-CSI-RS is transmitted in slot n but is not actually transmitted in slot n+9.

For slot n, it is related to P-CSI-RS, SSB and SP-CSI-RS. For the P-CSI-RS, 1 active resource is counted; for the set of SSB0 and SSB1, 1 active resource is counted, and for SP-CSI-RS, 1 active resource is counted. Hence, the total number of active resources in slot n is 3.

For slot n+9, it is related to P-CSI-RS, SSB and SP-CSI-RS. For the P-CSI-RS, 1 active resource is counted; for the set of SSB0 and SSB1, no active resource is counted; and for SP-CSI-RS, no active resource is counted. Hence, the total number of active resources in slot n is 1.

For slot n+20, it is related to P-CSI-RS and SSB but is unrelated to SP-CSI-RS. For the P-CSI-RS, 1 active resource is counted; and for the set of SSB0 and SSB1, 1 active resource is counted. Hence, the total number of active resources in slot n is 1.

Figure 10:
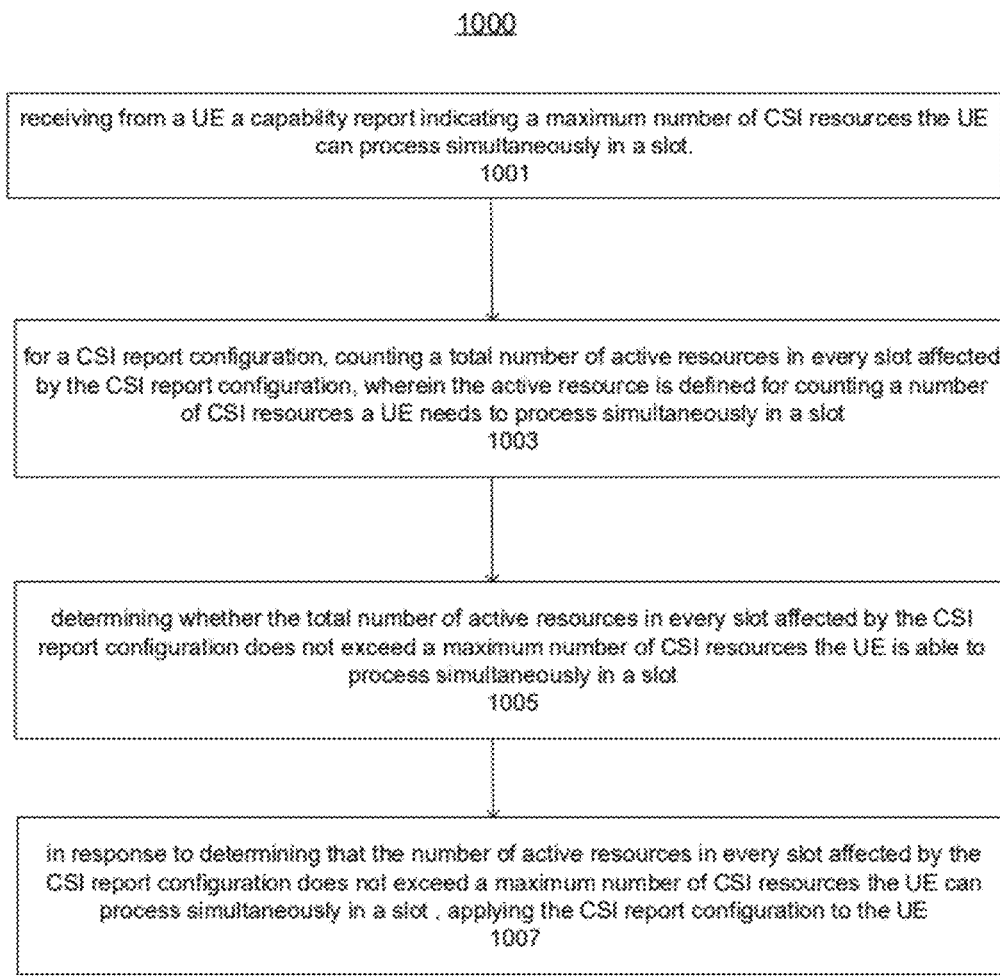
FIG. 10 is a flowchart diagrams illustrating an example method performed by a cellular base station according to some embodiments.

FIG. 10—Counting of Active Resources for CSI Report Configuration

FIG. 10 is a flowchart diagrams illustrating an example method 1000 performed by a cellular base station according to some embodiments.

As shown, the method 1000 comprises step 1001, where the cellular base station receives from a UE a capability report indicating a maximum number of CSI resources the UE can process simultaneously in a slot. The capability report may be sent by the UE in response to a request from the cellular base station. In some embodiments, step 1001 may be omitted and the cellular base station may use a default value for UE capability.

As shown, the method 1000 comprises step 1003, at which the cellular base station may count, for a CSI report configuration, a total number of active resources in every slot affected by the CSI report configuration, wherein the active resource is defined for counting a number of CSI resources a UE needs to process simultaneously in a slot.

The method 1000 further comprises step 1005, at which the cellular base station may determine whether the total number of active resources in every slot affected by the CSI report configuration does not exceed the maximum number of CSI resources the UE can process simultaneously in a slot.

The method 1000 further comprises step 1007, at which the cellular base station may, in response to determining that the number of active resources in every slot affected by the CSI report configuration does not exceed a maximum number of CSI resources the UE can process simultaneously in a slot, may apply the CSI report configuration to the UE.

Figure 11:
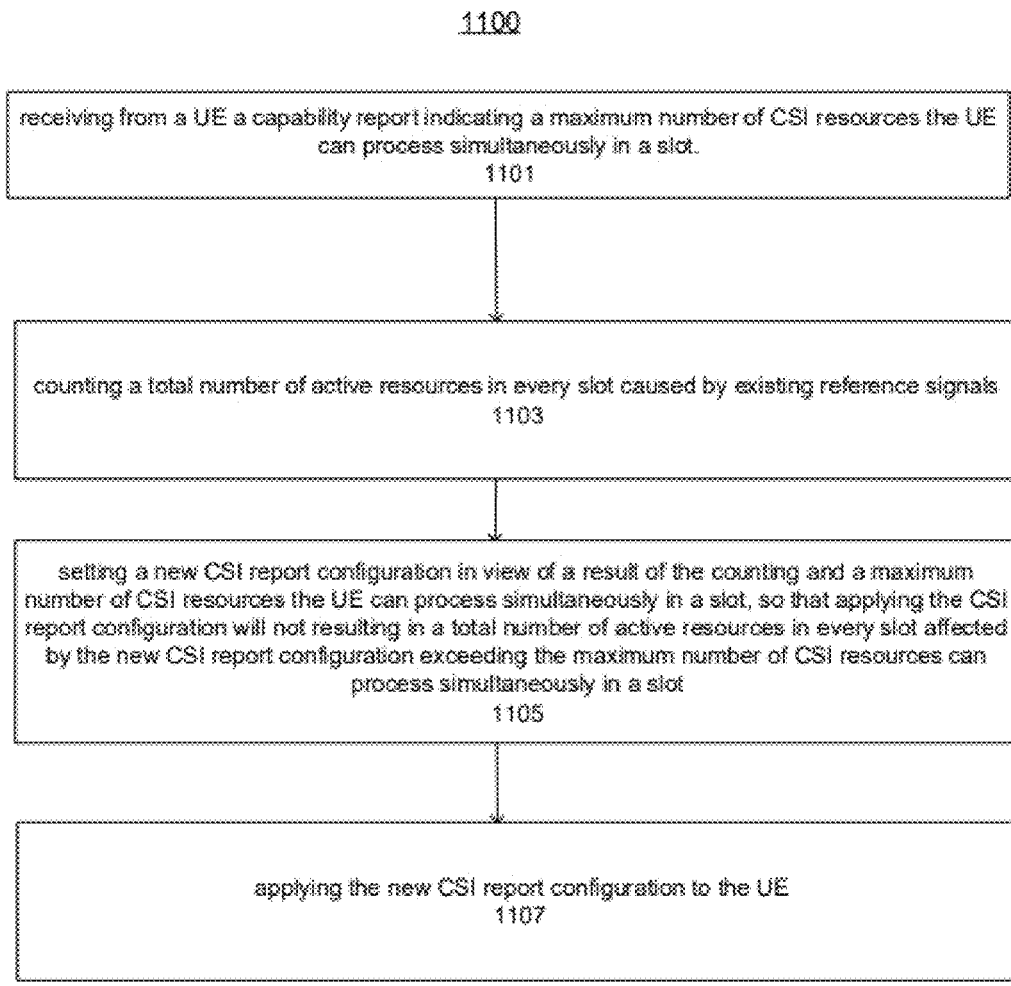
FIG. 11 is a flowchart diagrams illustrating an example method performed by a cellular base station according to some embodiments.

FIG. 11—Setting CSI Report Configuration in View of Counting of Active Resources FIG. 11 is a flowchart diagrams illustrating an example method 1100 performed by a cellular base station according to some embodiments.

As shown, the method 1100 comprises step 1101, which is similar as step 1001.

As shown, the method 1100 comprises step 1103, at which the cellular base station may counting a total number of active resources in every slot caused by existing reference signals.

The method 1100 may comprises step 1105, at which the cellular base station may set a new CSI report configuration in view of a result of the counting and the maximum number of CSI resources the UE can process simultaneously in a slot, so that applying the new CSI report configuration will not resulting in a total number of active resources in every slot affected by the new CSI report configuration exceeding the maximum number of CSI resources can process simultaneously in a slot.

The method 1100 may comprises step 1105, at which the cellular base station may applying the new CSI report configuration to the UE.

In various embodiments, some of the elements of the methods shown may be performed concurrently, in a different order than shown, may be substituted for by other method elements, or may be omitted. Additional elements may also be performed as desired.

In the following further exemplary embodiments are provided.

One set of embodiments may include a cellular base station, comprising: at least one antenna; at least one radio coupled to the at least one antenna; and a processor coupled to the at least one radio. The cellular base station is configured to count a total number of active resources in a slot, wherein an active resource is defined for counting a number of CSI resources a UE needs to process simultaneously in a slot.

According to some embodiments, the cellular base station is configured to perform one of the following: (i) for each SSB with a unique SSB index, counting 1 active resource in every slot; (ii) for each SSB with a unique SSB index, counting 1 active resource only in a slot within which the SSB is transmitted; and (iii) for multiple SSBs transmitted within a slot, counting 1 active resource only in said slot within which the multiple SSBs are transmitted.

According to some embodiments, the cellular base station is configured to, for each CSI-RS, perform one of the following: (i) counting 1 active resource in every slot affected by a CSI report configuration configuring the CSI-RS, (ii) counting 1 active resource only in a slot within which the CSI-RS is transmitted, and (iii) counting a number of active resources same as a number of ports of the CSI-RS only in a slot within which the CSI-RS is transmitted. The cellular base station is configured to, for each CSI-IM, perform one of the following: (i) counting 1 active resource in every slot affected by a CSI report configuration configuring the CSI-IM, (ii) counting 1 active resource only in a slot within which the CSI-IM is transmitted, and (iii) doing not count any number of active resources in any slot.

According to some embodiments, the cellular base station is configured to perform at least one of the following: for each periodic CSI-RS, counting 1 active resource in every slot within a time duration from when the periodic CSI-RS is configured by higher layer signaling to when the periodic CSI-RS is released by the higher layer signaling, or counting 1 active resource in every slot within a time duration from a first transmission of the periodic CSI-RS to when the periodic CSI-RS is released by the higher layer signaling; for each semi persistent CSI-RS, counting 1 active resource in every slot within a time duration from when the semi persistent CSI-RS is activated by MAC CE to when the semi persistent CSI-RS is deactivated by MAC CE, or counting 1 active resource in every slot within a time duration from a first transmission of the semi persistent CSI-RS to when the semi persistent CSI-RS is deactivated by MAC CE; or for each aperiodic CSI-RS, counting 1 active resource in every slot within a time duration from when the aperiodic CSI-RS is triggered by DCI to an end of reporting associated with the aperiodic CSI-RS, or counting 1 active resource in every slot within a time duration from a first transmission of the aperiodic CSI-RS to an end of reporting associated with the aperiodic CSI-RS.

According to some embodiments, the cellular base station is configured to perform at least one of the following: for each periodic CSI-IM, counting 1 active resource in every slot within a time duration from when the periodic CSI-IM is configured by higher layer signaling to when the periodic CSI-IM is released by the higher layer signaling, or counting 1 active resource in every slot within a time duration from a first transmission of the periodic CSI-IM to when the periodic CSI-IM is released by the higher layer signaling; for each semi persistent CSI-IM, counting 1 active resource in every slot within a time duration from when the semi persistent CSI-IM is activated by MAC CE to when the semi persistent CSI-IM is deactivated by MAC CE, or counting 1 active resource in every slot within a time duration from a first transmission of the semi persistent CSI-IM to when the semi persistent CSI-IM is deactivated by MAC CE; or for each aperiodic CSI-IM, counting 1 active resource in every slot within a time duration from when the aperiodic CSI-IM is triggered by DCI to an end of reporting associated with the aperiodic CSI-IM, or counting 1 active resource in every slot within a time duration from a first transmission of the aperiodic CSI-IM to an end of reporting associated with the aperiodic CSI-IM.

According to some embodiments, the cellular base station is further configured to perform double counting based on at least one of the following: (i) for CSI-IM and SSB, a corresponding number of active resources as counted in a corresponding slot is never double counted; (ii) for a single NZP CSI-RS, if it is configured for different purposes, a corresponding number of active resources as counted with respect to the NZP CSI-RS in a corresponding slot is double counted by a number of the different purposes; and (iii) for a single NZP CSI-RS, if it is configured for a first set of purposes, a number of active resources as counted with respect to the NZP CSI-RS in a corresponding slot is never double counted, and if it is configured for a second set of purposes, a number of active resources as counted with respect to the NZP CSI-RS in a corresponding slot is double counted by a number of the purposes in the second set.

According to some embodiments, the slot is a reference slot, the cellular base station is further configured to perform one of the following: (i) for 1 active resource counted in an actual slot, counting 1 active resource in every reference slot corresponding to the actual slot; and (ii) for 1 active resource counted in an actual slot, counting 1 active resource only in a reference slot overlapping a part of the actual slot during which a CSI resource corresponding to the active resource is transmitted.

According to some embodiments, the cellular base station is further configured to perform the following operations: for a CSI report configuration, counting a total number of active resources in every slot affected by the CSI report configuration, wherein the active resource is defined for counting a number of CSI resources a UE needs to process simultaneously in a slot; determining whether the total number of active resources in every slot affected by the CSI report configuration does not exceed a maximum number of CSI resources the UE can process simultaneously in a slot; and in response to determining that the number of active resources in every slot affected by the CSI report configuration does not exceed a maximum number of CSI resources the UE can process simultaneously in a slot, applying the CSI report configuration to the UE.

According to some embodiments, the cellular base station is further configured to perform the following operations: counting a total number of active resources in every slot caused by existing reference signals; setting a new CSI report configuration in view of a result of the counting and a maximum number of CSI resources the UE can process simultaneously in a slot, so that applying the CSI report configuration will not resulting in a total number of active resources in every slot affected by the new CSI report configuration exceeding the maximum number of CSI resources can process simultaneously in a slot; and applying the new CSI report configuration to the UE.

According to some embodiments, the cellular base station is further configured to receive from the UE a capability report indicating the maximum number of CSI resources the UE can process simultaneously in a slot.

Another set of embodiments may include a method comprising: at a cellular base station, counting a total number of active resources in a slot, wherein an active resource is defined for counting a number of CSI resources a UE needs to process simultaneously in a slot.

According to some embodiments, the method further comprises one of the following: (i) for each SSB with a unique SSB index, counting 1 active resource in every slot; (ii) for each SSB with a unique SSB index, counting 1 active resource only in a slot within which the SSB is transmitted; and (iii) for multiple SSBs transmitted within a slot, counting 1 active resource only in said slot within which the multiple SSBs are transmitted.

According to some embodiments, the method further comprises, for each CSI-RS, performing one of the following: (i) counting 1 active resource in every slot affected by a CSI report configuration configuring the CSI-RS, (ii) counting 1 active resource only in a slot within which the CSI-RS is transmitted, and (iii) counting a number of active resources same as a number of ports of the CSI-RS only in a slot within which the CSI-RS is transmitted. The method further comprises, for each CSI-IM, performing one of the following: (i) counting 1 active resource in every slot affected by a CSI report configuration configuring the CSI-IM, (ii) counting 1 active resource only in a slot within which the CSI-IM is transmitted, and (iii) doing not count any number of active resources in any slot.

According to some embodiments, the method further comprises at least one of the following: for each periodic CSI-RS, counting 1 active resource in every slot within a time duration from when the periodic CSI-RS is configured by higher layer signaling to when the periodic CSI-RS is released by the higher layer signaling, or counting 1 active resource in every slot within a time duration from a first transmission of the periodic CSI-RS to when the periodic CSI-RS is released by the higher layer signaling; for each semi persistent CSI-RS, counting 1 active resource in every slot within a time duration from when the semi persistent CSI-RS is activated by MAC CE to when the semi persistent CSI-RS is deactivated by MAC CE, or counting 1 active resource in every slot within a time duration from a first transmission of the semi persistent CSI-RS to when the semi persistent CSI-RS is deactivated by MAC CE; or for each aperiodic CSI-RS, counting 1 active resource in every slot within a time duration from when the aperiodic CSI-RS is triggered by DCI to an end of reporting associated with the aperiodic CSI-RS or counting 1 active resource in every slot within a time duration from a first transmission of the aperiodic CSI-RS to an end of reporting associated with the aperiodic CSI-RS.

According to some embodiments, the method further comprises at least one of the following: for each periodic CSI-IM, counting 1 active resource in every slot within a time duration from when the periodic CSI-IM is configured by higher layer signaling to when the periodic CSI-IM is released by the higher layer signaling, or counting 1 active resource in every slot within a time duration from a first transmission of the periodic CSI-IM to when the periodic CSI-IM is released by the higher layer signaling; for each semi persistent CSI-IM, counting 1 active resource in every slot within a time duration from when the semi persistent CSI-IM is activated by MAC CE to when the semi persistent CSI-IM is deactivated by MAC CE, or counting 1 active resource in every slot within a time duration from a first transmission of the semi persistent CSI-IM to when the semi persistent CSI-IM is deactivated by MAC CE, or for each aperiodic CSI-IM, counting 1 active resource in every slot within a time duration from when the aperiodic CSI-IM is triggered by DCI to an end of reporting associated with the aperiodic CSI-IM or counting 1 active resource in every slot within a time duration from a first transmission of the aperiodic CSI-IM to an end of reporting associated with the aperiodic CSI-IM.

According to some embodiments, the method further comprises performing double counting based on at least one of the following: (i) for SCI-IM and SSB, a corresponding number of active resources as counted in a corresponding slot is never double counted; (ii) for a single NZP CSI-RS, if it is configured for different purposes, a corresponding number of active resources as counted with respect to the NZP CSI-RS in a corresponding slot is double counted by a number of the different purposes; and (iii) for a single NZP CSI-RS, if it is configured for a first set of purposes, a number of active resources as counted with respect to the NZP CSI-RS in a corresponding slot is never double counted, and if it is configured for a second set of purposes, a number of active resources as counted with respect to the NZP CSI-RS in a corresponding slot is double counted by a number of the purposes in the second set.

According to some embodiments, the slot is a reference slot, the method further comprises performing one of the following: (i) for 1 active resource counted in an actual slot, counting 1 active resource in every reference slot corresponding to the actual slot; and (ii) for 1 active resource counted in an actual slot, counting 1 active resource only in a reference slot overlapping a part of the actual slot during which a CSI resource corresponding to the active resource is transmitted.

Yet another set of embodiments may include an apparatus for operating a cellular base station, comprising a processor configured to cause the cellular base station to implement any or all parts of any of the preceding examples.

A yet further exemplary embodiment may include a non-transitory computer accessible memory medium comprising program instructions which, when executed at a cellular base station, cause the cellular base station to implement any or all parts of any of the preceding examples.

A still further exemplary embodiment may include a computer program product comprising program instructions which, when executed at a cellular base station, cause the cellular base station to implement any or all parts of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station, comprising:
   at least one antenna;
   at least one radio coupled to the at least one antenna; and
   a processor coupled to the at least one radio, wherein the processor is configured to:
   count a total number of active resources in a slot, wherein an active resource is defined for counting a number of channel state information (CSI) resources a user equipment (UE) needs to process simultaneously in a slot; and
   in a slot within which a synchronization signal block (SSB) is transmitted, count 1 active resource for each SSB with a unique SSB index.

2. The base station of claim 1, wherein the processor is further configured to:
   count 1 active resource only in a slot within which the CSI-reference signal (RS) is transmitted; and
   for each CSI-interference measurement (IM) in a slot within which the CSI-IM is transmitted, count 1 active resource.

3. The base station of claim 1, wherein the processor is further configured to:
   wherein a single Non Zero Power (NZP) CSI-reference signal (RS) is configured for a first set of purposes, count a number of active resources with respect to the single NZP CSI-RS in a corresponding slot; and
   wherein the single NZP CSI-RS is configured for a second set of purposes, double count a number of active resources with respect to the single NZP CSI-RS in a corresponding slot by a number of purposes in the second set of purposes.

4. The base station of claim 1, wherein the slot is a reference slot, the processor is further configured to:
   count 1 active resource in an actual slot, where the reference slot overlaps a part of the actual slot during which a CSI resource corresponding to the active resource is transmitted.

5. The base station of claim 1, wherein the processor is further configured to:
   for a CSI report configuration, count a total number of active resources in every slot affected by the CSI report configuration;
   determine whether the total number of active resources in every slot affected by the CSI report configuration does not exceed a maximum number of CSI resources the UE can process simultaneously in a slot; and
   in response to determining that the number of active resources in every slot affected by the CSI report configuration does not exceed the maximum number of CSI resources the UE can process simultaneously in a slot, apply the CSI report configuration to the UE.

6. The base station of claim 1, wherein the processor is further configured to:
   count a total number of active resources in every slot caused by existing reference signals;
   set a new CSI report configuration in view of a result of the counting and a maximum number of CSI resources the UE can process simultaneously in a slot, so that applying the CSI report configuration will not result in a total number of active resources in every slot affected by the new CSI report configuration exceeding the maximum number of CSI resources the UE can process simultaneously in a slot; and
   apply the new CSI report configuration to the UE.

7. The base station of claim 5, wherein the processor is further configured to:
   receive from the UE a capability report indicating the maximum number of CSI resources the UE can process simultaneously in a slot.

8. A method for a base station, comprising:
   counting a total number of active resources in a slot, wherein an active resource is defined for counting a number of channel state information (CSI) resources a user equipment (UE) needs to process simultaneously in a slot; and in a slot within which a CSI-reference signal (RS) is transmitted, counting 1 active resource for each CSI-RS.

9. The method of claim 8, further comprising
in a slot within which a synchronization signal block (SSB) is transmitted, counting 1 active resource for each SSB with a unique SSB index.

10. The method of claim 8, further comprising:
for each Zero Power RS for Interference Measurement (CSI-IM)-in a slot within which the CSI-IM is transmitted, counting 1 active resource.

11. The method of claim 8, further comprising:
wherein a single Non Zero Power (NZP) CSI-RS is configured for a first set of purposes, counting a number of active resources with respect to the single NZP CSI-RS in a corresponding slot; and
wherein the single NZP CSI-RS is configured for a second set of purposes, double counting a number of active resources with respect to the single NZP CSI-RS in a corresponding slot by a number of purposes in the second set of purposes.

12. The method of claim 8, wherein the slot is a reference slot, the method further comprises
counting 1 active resource in an actual slot, where the reference slot overlaps a part of the actual slot during which a CSI resource corresponding to the active resource is transmitted.

13. The method of claim 8, further comprising:
for a CSI report configuration, counting a total number of active resources in every slot affected by the CSI report configuration;
determining whether the total number of active resources in every slot affected by the CSI report configuration does not exceed a maximum number of CSI resources the UE can process simultaneously in a slot; and
in response to determining that the number of active resources in every slot affected by the CSI report configuration does not exceed the maximum number of CSI resources the UE can process simultaneously in a slot, applying the CSI report configuration to the UE.

14. The method of claim 8, further comprising:
counting a total number of active resources in every slot affected by an existing CSI report configuration and synchronization signal block (SSB);
setting a new CSI report configuration in view of a result of the counting and a maximum number of CSI resources the UE can process simultaneously in a slot, so that applying the CSI report configuration will not result in a total number of active resources in every slot affected by the new CSI report configuration exceeding the maximum number of CSI resources the UE can process simultaneously in a slot; and
applying the new CSI report configuration to the UE.

15. The method of claim 14, further comprising:
receiving from the UE a capability report indicating the maximum number of CSI resources the UE can process simultaneously in a slot.

16. A non-transitory computer-readable medium storing instructions that, when executed by a processor of a base station, cause the base station to perform operations, the operations comprising:
counting a total number of active resources in a slot, wherein an active resource is defined for counting a number of channel state information (CSI) resources a user equipment (UE) needs to process simultaneously in a slot; and
counting 1 active resource in an actual slot, where a reference slot overlaps a part of the actual slot during which a CSI resource corresponding to the active resource is transmitted.

17. The non-transitory computer-readable medium of claim 16, wherein the operations further comprise: in a slot within which a synchronization signal block (SSB) is transmitted, counting 1 active resource for each SSB with a unique SSB index.

18. The non-transitory computer-readable medium of claim 16, wherein the operations further comprise: for each CSI-interference measurement (IM) in a slot within which the CSI-IM is transmitted, counting 1 active resource.

19. The non-transitory computer-readable medium of claim 16, wherein the operations further comprise:
for a CSI report configuration, counting a total number of active resources in every slot affected by the CSI report configuration;
determining whether the total number of active resources in every slot affected by the CSI report configuration does not exceed a maximum number of CSI resources the UE can process simultaneously in a slot; and
in response to determining that the number of active resources in every slot affected by the CSI report configuration does not exceed the maximum number of CSI resources the UE can process simultaneously in a slot, applying the CSI report configuration to the UE.

20. The non-transitory computer-readable medium of claim 16, wherein the operations further comprise:
counting a total number of active resources in every slot affected by an existing CSI report configuration and synchronization signal block (SSB);
setting a new CSI report configuration in view of a result of the counting and a maximum number of CSI resources the UE can process simultaneously in a slot, so that applying the CSI report configuration will not result in a total number of active resources in every slot affected by the new CSI report configuration exceeding the maximum number of CSI resources the UE can process simultaneously in a slot; and
applying the new CSI report configuration to the UE.

* * * * *

UNITED STATES PATENT AND TRADEMARK OFFICE
CERTIFICATE OF CORRECTION

| | | |
|---|---|---|
| PATENT NO. | : 12,041,007 B2 | Page 1 of 1 |
| APPLICATION NO. | : 17/441797 | |
| DATED | : July 16, 2024 | |
| INVENTOR(S) | : Sun et al. | |

It is certified that error appears in the above-identified patent and that said Letters Patent is hereby corrected as shown below:

In the Specification

In Column 1, Line 4, before "FIELD" on Line 5, insert -- This application is a U.S. National Phase of international Application No. PCT/CN2021/072013, filed January 15, 2021, which is hereby incorporated by reference in its entirety. -- as a new paragraph.

In Column 15, Line 38, after "2." insert the line -- Then only the slot n with actual transmission of AP-CSI-RS, 2 active resources are counted. --.

Signed and Sealed this
Twenty-fourth Day of June, 2025

Coke Morgan Stewart
*Acting Director of the United States Patent and Trademark Office*